United States Patent [19]

Duffer et al.

[11] Patent Number: 4,487,807
[45] Date of Patent: Dec. 11, 1984

[54] MIXED ACID STAIN INHIBITOR

[75] Inventors: Paul F. Duffer, Creighton; Joseph D. Kelly, Cheswick; Helmut Franz, Pittsburgh, all of Pa.

[73] Assignee: PPG Industries, Inc., Pittsburgh, Pa.

[21] Appl. No.: 427,380

[22] Filed: Sep. 29, 1982

[51] Int. Cl.³ .............................................. B32B 27/00
[52] U.S. Cl. .................................... 428/422; 428/426; 428/438; 428/441; 428/442; 427/202; 427/421; 427/154
[58] Field of Search ............... 428/438, 441, 421, 426, 428/442; 427/202, 421, 154

[56] References Cited

U.S. PATENT DOCUMENTS

| 3,723,312 | 3/1973 | Hay, Jr. ................................. 252/11 |
| 3,798,112 | 3/1974 | Hay, Jr. ................................. 161/162 |
| 4,011,359 | 3/1977 | Simpkin et al. ..................... 428/326 |
| 4,200,670 | 4/1980 | Albach ................................ 427/154 |

Primary Examiner—George F. Lesmes
Assistant Examiner—E. Rollins Buffalow
Attorney, Agent, or Firm—Donna L. Seidel

[57] ABSTRACT

A method is disclosed for protecting glass surfaces in a stack of glass sheets by treating the surfaces with a mixture of stain-inhibiting organic acids which crystallize on the glass, and separating adjacent surfaces with an interleaving material.

15 Claims, 3 Drawing Figures

MIXED ACID STAIN INHIBITOR

BACKGROUND OF THE INVENTION

The present invention relates generally to the art of protecting a glass surface from staining, and more particularly to the art of stain inhibiting organic acids.

Glass sheets are typically stacked in face-to-face relationship for handling, transportation and storage. Unfortunately, stacked glass sheets are susceptible to scratches caused by relative movement between adjacent surfaces, and staining caused by alkali buildup between adjacent surfaces which degrades the original colorlessness and transparency of the glass.

It is well known in the art to separate adjacent glass surfaces by interposing sheets of paper between the sheets of glass to protect the glass surfaces. However, the techniques for utilizing paper interleaving are time-consuming and costly. Less expensive means for separating glass sheets are particulate interleaving materials, which include natural products, such as wood flour, and synthetic products such as polyethylene, polystyrene or polyacrylate beads. While these inert interleaving materials provide a measure of scratch protection at relatively low cost, staining remains a significant problem.

U.S. Pat. No. 3,723,312 to Hay addresses the problems of staining and scratching of packaged glass sheets. In place of interleaving paper, Hay proposes the use of dedusted agglomerated salicylic acid in conjunction with an inert particulate separator material, such as wood flour or polystyrene, applied at a rate such that one pound of interleaving material protects no more than 4000 square feet, preferably 1000 to 3000 square feet, of glass. According to Hay, use of agglomerated salicylic acid mixed in equal proportion with inert polystyrene is effective to eliminate staining for nearly as long as interleaving paper with application costs which approximate those for wood flour or methyl methacrylate which have no particular stain inhibiting properties.

U.S. Pat. No. 3,798,112 to Hay also discloses a mixture of dedusted agglomerated salicylic acid and inert separator material, providing a novel method for agglomerating the acid with polyethylene oxide to produce an interleaving material comprising substantially spherical particles less than about 30 mesh which is applied to glass sheet surfaces at a rate of about one pound covering not more than about 4000 square feet. The interleaving material may further comprise an inert particulate separating material such as wood flour, polystyrene or LUCITE ® methacrylate polyester beads in a ratio up to about 4:1 with respect to the agglomerated organic acid.

U.S. Pat. No. 4,011,359 to Simpkin et al discloses an interleaving material for separating glass sheets and protecting them from scratching and staining which comprises a porous, finely divided support material, impregnated with a weakly acidic material, and fine particles of a chemically inert plastic material. The porous support material may be a cellulose material of vegetable origin or a wood flour. The weakly acidic material is a weak organic acid, preferably organic acids having 3 to 10 carbon atoms, and especially adipic, maleic, sebacic, succinic, benzoic and salicylic acids. The inert plastic separator material may be polyethylene, polystyrene, polytetrafluoroethylene or a methacrylate polyester, and preferably has a larger particle size than the acid-impregnated support material. The interleaving material may be applied to the glass by conventional powder applicators.

U.S. Pat. No. 4,200,670 to Albach describes a method for protecting glass sheets during packing, shipping and storing. The method involves applying water, a stain inhibiting material, and dry, finely divided particles of a mechanical separator to the surface of glass sheets, prior to stacking them, in a plurality of sequential steps that produce an adherent coating on each glass sheet, which coating becomes a protective interleaving between facing surfaces when the sheets are stacked. According to one specific embodiment, this is accomplished by applying the water and stain inhibitor to the glass as an aqueous solution of the latter to provide a wet layer on the sheet surface, and then separately applying a dry particulate layer of a mechanical separator to the wet layer. The method can also be carried out by first spraying the glass surface with water alone and then separately applying a layer or layers of a stain inhibitor and a mechanical separator in dry powdered form to the layer of water, or by first applying a mixture of dry powdered stain inhibitor and mechanical separator and then spraying the dry materials with water.

SUMMARY OF THE INVENTION

The present invention provides a method for protecting a glass surface from staining and scratching by treating the glass surface with a solution of a mixture of stain-inhibiting organic acids, including a dicarboxylic hydroxy acid, which mixture crystallizes on the glass surface immediately upon the evaporation of the solvent. The mixed acid compositions of the present invention crystallize on contact with the hot glass surface upon evaporation of the solvent, whereas single acid compositions are found to form a filmy residue which may interfere with subsequent handling, cutting or packaging techniques.

DESCRIPTION OF THE PREFERRED EMBODIMENTS

Figure 1:
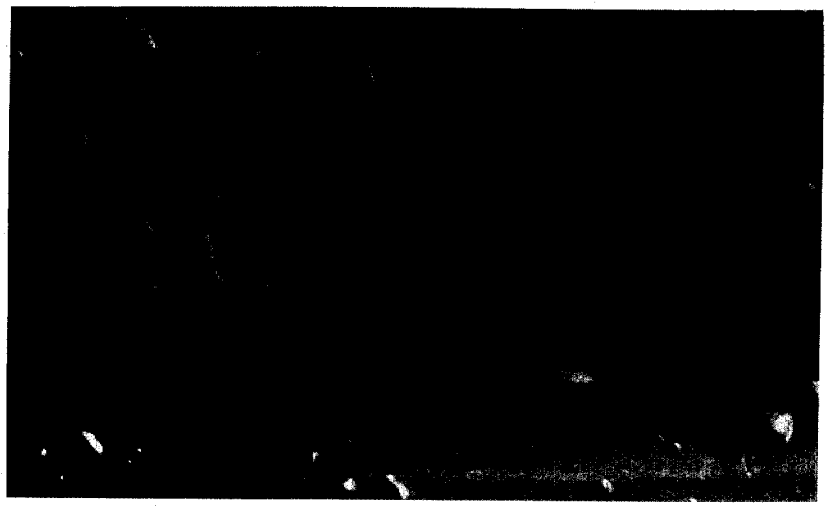
FIG. 1 illustrates a photograph at 160X magnification of a glass sheet sprayed at a temperature of 150° F. (about 65° C.) with an aqueous solution of 0.75 percent acid. As the figure shows, the malic acid residue is amorphous, not crystalline.
Figure 2:
FIG. 2 illustrates a photograph at 160X magnification of a glass sheet sprayed at a temperature of 150° F. (about 65° C.) with an aqueous solution of 0.40 percent malic acid and 0.35 percent succinic acid. As the figure shows, the mixed acids are crystallized on the glass surface.
Figure 3:
FIG. 3 illustrates a photograph at 160X magnification of a glass sheet sprayed at a temperature of 150° F. (about 65° C.) with an aqueous solution of 0.35 percent malic acid and 0.40 percent adipic acid. As the figure shows, the mixed acids are crystallized on the glass surface.

Glass sheets are treated with a mixture of stain-inhibiting organic acids in solution, which acids are crystallized on the glass surface prior to applying a particulate interleaving material in order to provide enhanced stain and scratch resistance in the course of handling, stacking, transportation and storage.

Treatment of the glass surface with a solution of a mixture of stain-inhibiting organic acids in accordance with the present invention is preferably carried out by contacting the glass surface with an aqueous solution of the mixture of stain-inhibiting organic acids by any conventional technique, preferably spraying, at a temperature sufficient to achieve immediate evaporation of the solvent and crystallization of the acids, preferably a temperature of about 110° to 180° F. (about 43° to 82° C.).

The concentration of the mixture of stain-inhibiting organic acids in the solution is preferably greater than 0.1 percent, more preferably in the range of about 0.5 to 1 percent. A preferred mixture of stain-inhibiting organic acids preferably comprises dicarboxylic acids, at least one of which is a hydroxy acid, preferably malic acid. The mixed acid solution is preferably applied to a glass surface which is at a temperature of about 140° to 160° F. (about 60° to 71° C.) in order to immediately evaporate the solvent, preferably water, and crystallize the acids on the hot glass surface.

In a preferred embodiment of the present invention, an aqueous solution comprising about 0.3 to 0.5 percent malic acid and about 0.3 to 0.6 percent adipic acid or succinic acid is sprayed onto a glass surface at a temperature of about 140° to 160° F. (about 60° to 71° C.). The solution essentially dries on contact with the hot glass surface and the mixed acids crystallize on the glass surface. The crystallized acid treated glass surfaces are separated by any suitable interleaving material, preferably a particulate interleaving material. For example, various synthetic materials such as polyethylene, polystyrene, polytetrafluoroethylene and polyacrylate beads are acceptable, as well as natural porous cellulose materials such as wood flour and rice flour, preferably applied at a rate of about one pound per 5000 to 9000 square feet of glass surface.

It appears that the acidic organic stain-inhibiting compounds neutralize alkali buildup between stacked glass sheets which is believed to cause the staining which typically occurs on the surface of packaged glass sheets. The stain-inhibiting acid treatment, in combination with the interleaving material offers optimum protection of the treated glass surfaces from stain and scratches. The use of a mixture of acids which readily crystallizes on a hot glass surface upon evaporation of the solvent eliminates any problems which might arise with an amorphous acid residue on the treated surface.

The present invention will be further understood from the description of specific examples which follow.

EXAMPLE I

Sheets of soda-lime-silica float glass are sprayed at a temperature of about 140° to 160° F. (about 60° to 71° C.) with an aqueous solution containing 0.40 percent malic acid and 0.35 percent succinic acid. The solution essentially dries on contact with the hot glass surface crystallizing the mixed acids on the glass surface. The sheets, carrying about 20 milligrams per square foot of acid, are then dusted with woodflour at a rate of about one pound per 7500 square feet, stacked, and placed in a humidity chamber for accelerated staining tests. After exposure to conditions of 140° F. (about 60° C.) and 100 percent relative humidity for 30 days, the glass exhibited no stain.

EXAMPLE II

On a larger scale, the top surface of a freshly-formed and annealed float glass ribbon is sprayed at a temperature of about 140° F. (about 61° C.) with an aqueous solution containing 0.35 percent malic acid and 0.40 percent adipic acid. The treated surface, which bears about 7 to 10 milligrams of malic acid and about 7 to 10 milligrams of adipic acid per square foot of glass, is dusted with wood flour using conventional powder application equipment set to distribute one pound of interleaving material to about 7500 square feet of glass. Sheets of treated glass are stacked and exposed to 140° F. (about 60° C.) at 100 percent relative humidity. For comparison, sheets of glass, not treated with the mixed acid but dusted with wood flour at the same level of distribution, are also tested. After 30 days exposure, the mixed acid treated glass shows no stain while the glass only dusted with wood flour is stained throughout.

EXAMPLE III

A standard interleaving material comprises particulate polymethyl methacrylate (LUCITE® powder) combined with adipic acid. This interleaving material is applied at a rate of about one pound per 7500 square feet to glass sheets which are stacked and exposed in a humidity chamber to conditions of 140° F. (about 60° C.) and 100 percent relative humidity. The glass sheets exhibited no staining after 7 days, light stain after 14 days, and heavy stain after 21 days. For comparison, glass sheets are treated first with the mixed acid stain inhibiting composition of Example II and then the interleaving material as above. The application rates are about 5 to 7 milligrams per square foot of acid and about one pound per 7500 square feet of the acid treated powder. The sheets are stacked and exposed as above, and exhibit to stain after more than 40 days.

The above examples are offered only to illustrate the present invention. Various other materials, concentrations and combinations may be employed. For example, lighter applications of the stain-inhibiting acids, e.g., 5 to 10 milligrams per square foot, may be used in combination with acidified powder interleaving, while heavier applications, e.g., 15 to 20 milligrams per square foot are preferred when a neutral powder interleaving is employed. The scope of the present invention is defined by the following claims.

We claim:
1. A method for protecting a glass surface which comprises the steps of:
   a. contacting the glass surface with a solution of a mixture of stain-inhibiting organic carboxylic acids, at least one of which is a hydroxy acid, which mixture crystallizes upon evaporation of the solvent;
   b. evaporating the solvent to form a crystallized mixed acid deposit on the glass surface; and
   c. applying to the acid treated glass surface an interleaving material prior to contacting the glass surface in facing relationship with another glass surface.

2. The method according to claim 1, wherein the glass surface is treated with a solution comprising a mixture of dicarboxylic acids, at least one of which is a hydroxy acid.

3. The method according to claim 2, wherein the glass surface is treated at a temperature from about 110° F. (about 43° C.) to about 180° F. (about 82° C.) with an aqueous solution comprising malic acid and a dicarboxylic acid selected from the group consisting of succinic acid and adipic acid.

4. The method according to claim 3, wherein the glass surface is treated at a temperature of about 140° F. (about 60° C.) to about 160° F. (about 71° C.) with an aqueous solution of about 0.1 to 2 percent of the acids wherein about 40 to 60 percent of the mixture of acids is malic acid.

5. The method according to claim 1, wherein the interleaving material is a particulate solid.

6. The method according to claim 5, wherein the particulate solid interleaving material is a porous cellulose material.

7. The method according to claim 6, wherein the interleaving material is wood flour.

8. The method according to claim 5, wherein the particulate solid interleaving material is a synthetic polymer.

9. The method according to claim 8, wherein the interleaving material is selected from the group consisting of polyethylene, polystyrene, polytetrafluoroethylene and polymethylmethacrylate.

10. An article of manufacture comprising:
 a. a plurality of glass sheets, the surfaces of which are separated by a crystallized deposit comprising a mixture of stain-inhibiting organic carboxylic acids comprising at least one hydroxy acid; and
 b. an interleaving material interspersed between said glass sheets.

11. The article according to claim 10, wherein the mixture of organic acids comprises a plurality of dicarboxylic acids at least one of which is a hydroxy acid.

12. The article according to claim 11, wherein the mixture of acids comprises malic acid and an acid selected from the group consisting of succinic acid and adipic acid.

13. The article according to claim 10, wherein the interleaving material is a cellulose product.

14. The article according to claim 13, wherein the interleaving material is wood flour.

15. The article according to claim 10, wherein the interleaving material is a particulate solid synthetic polymer selected from the group consisting of polyethylene, polystyrene, polytetrafluoroethylene and polyacrylates.

* * * * *